US010116664B2

(12) United States Patent
Krishnan et al.

(10) Patent No.: US 10,116,664 B2
(45) Date of Patent: Oct. 30, 2018

(54) AUTHORIZATION POLICY FOR GROUP-CENTRIC SECURE INFORMATION SHARING

(76) Inventors: Ram Krishnan, San Antonio, TX (US); Ravinderpal S. Sandhu, Helotes, TX (US)

( * ) Notice: Subject to any disclaimer, the term of this patent is extended or adjusted under 35 U.S.C. 154(b) by 903 days.

(21) Appl. No.: 14/241,252

(22) PCT Filed: Aug. 27, 2012

(86) PCT No.: PCT/US2012/052501
§ 371 (c)(1),
(2), (4) Date: Sep. 5, 2014

(87) PCT Pub. No.: WO2013/033012
PCT Pub. Date: Mar. 7, 2013

(65) Prior Publication Data

US 2015/0020147 A1 Jan. 15, 2015

Related U.S. Application Data

(60) Provisional application No. 61/527,816, filed on Aug. 26, 2011.

(51) Int. Cl.
*H04L 29/06* (2006.01)
*G06F 21/62* (2013.01)

(52) U.S. Cl.
CPC ........ *H04L 63/104* (2013.01); *G06F 21/6218* (2013.01); *H04L 63/20* (2013.01)

(58) Field of Classification Search
CPC ....... H04L 63/08; H04L 63/10; H04L 63/102; H04L 63/104; H04L 63/20; G06F 21/6218
See application file for complete search history.

(56) References Cited

U.S. PATENT DOCUMENTS

2009/0319529 A1* 12/2009 Bartlett ............... G06F 21/6209

OTHER PUBLICATIONS

"Ram Narayan Krishnan, Group-Centric Secure Information Sharing Models, Fall Semester 2009, Publisher: George Mason University, pp. 20-21, 26-28,64-66 and 93-95" (Year: 2009).*
"Amit Mahale, Group Centric Informat ion Sharing using Hierarchical Models, Jun. 29, 2011, Publisher: UMBC, pp. 10-12" (Year: 2011).*
"Flavio Lerda, Distributed-Memory Model Checking with SPIN, Aug. 27, 1999, Springer, Berlin, Heidelberg, p. 6" (Year: 1999).*

* cited by examiner

*Primary Examiner* — Hadi S Armouche
*Assistant Examiner* — Shaqueal D Wade
(74) *Attorney, Agent, or Firm* — Jackson Walker LLP

(57) ABSTRACT

In the present specification, a methodology for incremental security policy specification at varying levels of abstraction is disclosed. The method maintains strict equivalence with respect to authorization state and is based on the group-centric secure information sharing (g-SIS) domain, which is known in the art. A g-SIS authorization policy is specified statelessly, in that it focuses solely on specifying the precise conditions under which authorization can hold in the system while only considering the history of actions that have occurred. The policy supports join, leave, add, and remove operations, which may have either strict or liberal semantics. The stateful application policy is then specified using linear temporal logic. The stateful specification is authorization equivalent to the stateless specification, and may enforce well-formedness constraints.

7 Claims, 4 Drawing Sheets

Part (ii) Stateful Trace

AUTHORIZATION POLICY FOR GROUP-CENTRIC SECURE INFORMATION SHARING

CROSS REFERENCE TO RELATED APPLICATIONS

This application claims priority to U.S. Provisional Application 61/527,816, entitled "Stateful Pi-System Security Specification." The foregoing is incorporated herein by reference.

BACKGROUND OF THE INVENTION

This specification relates to the field of group-centric secure information policies, and more particularly to implementation of a stateful group-centric secure information policy based on a stateless specification.

Group-centric secure information sharing schema are known in the prior art. Such schema are known to be relatively abstract in construction.

The Bell-LaPadula model is also known in the art, and provides a lattice structure of security labels and simple-security and star-properties to enforce one-directional information flow in the lattice. This is a stateful specification in that it describes data structures and rules that are enforceable. The non-interference specification is stateless and makes reference only to input-output behavior of a secure system.

SUMMARY OF THE INVENTION

Figure 1:
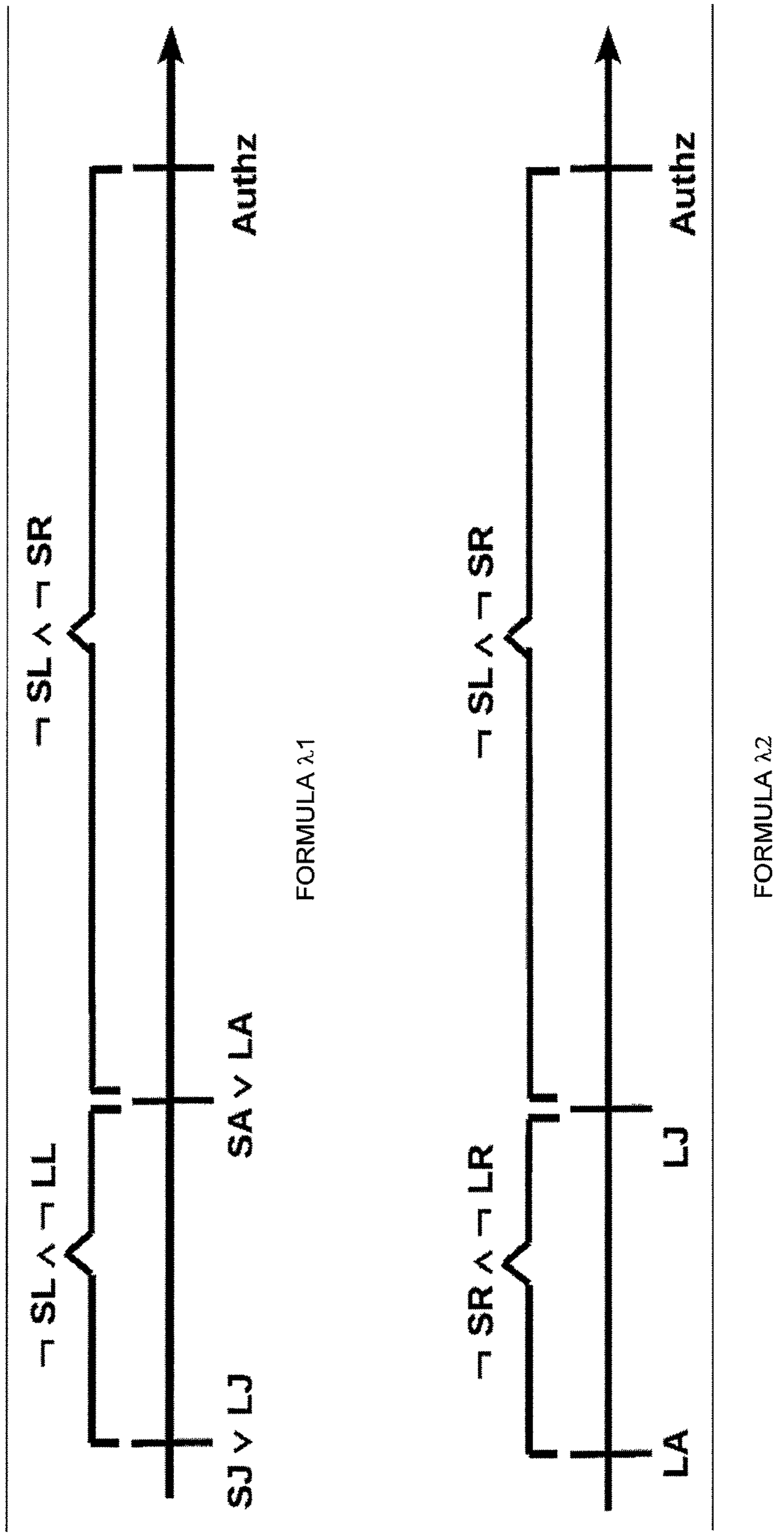
FIG. 1 is a diagram of stateless traces in s stateless security policy.

In one aspect, a methodology for incremental security policy specification at varying levels of abstraction is disclosed. The method maintains strict equivalence with respect to authorization state and is based on the group-centric secure information sharing (g-SIS) domain, which is known in the art. A g-SIS authorization policy is specified statelessly, in that it focuses solely on specifying the precise conditions under which authorization can hold in the system while only considering the history of actions that have occurred. The policy supports join, leave, add, and remove operations, which may have either strict or liberal semantics. The stateful application policy is then specified using linear temporal logic. The stateful specification is authorization equivalent to the stateless specification, and may enforce well-formedness constraints.

DETAILED DESCRIPTION OF THE EMBODIMENTS

1. Introduction

A known issue in access control implementations is the consistency of specification and enforcement of authorization policies. This specification discloses a method of bridging the specification of an authorization policy on the one and and enforcement of an authorization-equivalent policy on the other hand. The group-centric secure information sharing (g-SIS) model is used as a platform. In g-SIS, users and objects are brought together in a group to promote sharing and collaboration. Users may join and leave and objects may be added and removed from the group. The join, leave, add and remove operations may have different authorization semantics.

A formal set of core properties that are required of all g-SIS specifications are defined herein, given the basic group operations of join, leave, add and remove. Further, a specification, called the π-system, is disclosed and proved to satisfy the core g-SIS properties.

The π-system specification is defined statelessly using first-order linear temporal logic (FOTL). (FOTL differs from the familiar propositional linear temporal logic by incorporating predicates with parameters, constants, variables, and quantifiers.) The π-system is not directly enforceable in the way it is specified because it does not define the data structures that need to be maintained in order to make authorization decisions. Instead, the FOTL characterization of the π-system simply specifies the sequence of actions that need to have occurred in the past in order for authorization to hold at any given state. For example, a stateless specification may specify that a user may access an object in a group in a particular state if and only if the user had joined the group as a member in the past, the object has been added to the group (whereby the object is said to be "in" the group) in the and both the user and object are current members of or in the group (that is, the user has not left and the object has not been removed). The characterization in FOTL does not specify how to enforce that policy. A stateful specification, on the other hand, specifies the data structures that need to be maintained in the system so that they can be inspected in each state and authorization decisions can be made.

This specification discloses a method of developing a stateful specification for the π-system and demonstrates that the stateful specification is authorization equivalent to the stateless π-system specification. That is, a user will be authorized to access an object in a group in the stateful π-system specification if and only if it is also the case in the stateless π-system specification.

The separation of stateless and stateful specifications has a number of important virtues. A security policy researcher developing the stateless specification is not distracted by the data structures that need to be designed and maintained. Instead, she can focus purely on the precise characterization of the conditions under which authorization should hold in her system. Formal specification using FOTL also allows one to conduct rigorous formal analysis using automated techniques such as model checking, which is known in the art.

Once the stateless specification is developed, one can then focus on the data structure design and mechanisms needed to enforce the stateless policy. While the stateless specification may be too abstract for a non-expert in the field, the stateful specification is relatively concrete and understandable, and can be implemented by relatively competent programmers. The techniques disclosed herein include algorithmic specification of stateful π-system and induction for proofs.

TABLE 1

| Intuitive summary of temporal operators | | | |
|---|---|---|---|
| Future/ Past | Operator | Read as | Explanation |
| Future | ○ | Next | (○p) means that the formula p holds in the next state. |
| | □ | Henceforth | (□p) means that the formula p will continuously hold in all future states starting from the current state. |
| | W | Unless | It says that p holds either until the next occurrence of q or if q never occurs, it holds throughout. |
| Past | ♦ | Once | (♦p) means that formula p held at least once in the past. |
| | S | Since | (p S q) means that q happened in the past and p held continuously from the position following the last occurrence of q to the present. |

2. Foundational Concepts

2.1. Overview of g-SIS

In g-SIS, users may join, leave and re-join the group as members. Similarly, objects may be added, removed and re-added as being "in" the group. Authorization may hold in any state depending on the relative membership status of the user and object in question. The group operations join, leave, add and remove can be of different types with various authorization semantics. The following shorthand denotes different semantics of group operations:

$Join(u,g)=(join_1(u,g)\vee join_2(u,g)\vee \ldots \vee join_m(u,g))$ $Leave(u,g)=(leave_1(u,g)\vee leave_2(u,g)\vee \ldots \vee leave_n(u,g))$ $Add(o,g)=(add_1(o,g)\vee add_2(o,g)\vee \ldots \vee add_p(o,g))$ $Remove(o,g)=(remove_1(o,g)\vee remove_2(o,g)\vee \ldots \vee remove_q(o,g))$ For instance, $join_1(u,g)$ could represent a species of join operation that is different in authorization semantics from that of species $join_2(u,g)$. Join(u,g) denotes that a generic join operation has occurred for u in g.

Definition 1 (State in Stateless Specification). A state in the stateless specification is an interpretation that maps each predicate in the language to a relation over appropriate carriers.

The predicates in the g-SIS language include action predicates such as Join, Leave, Add and Remove and an authorization predicate Authz. These predicates are specified over appropriate sorts (types). The semantic values over which a variable ranges depend on the variable's sort and are drawn from a set that is called the carrier of that sort. In this specification, standard upper-case roman characters such as U (user sort) are used to denote sorts and calligraphic letters such as $\mathcal{U}$ (user carrier) to denote the corresponding carriers.

Definition 2 (Stateless Trace). A trace in the stateless specification is an infinite sequence of states.

The formulas specified in FIG. 1 disclose stateless traces.

2.2. Well-Formed Traces

The following formulas treat the authorization a user has to access an object independently of actions involving other users and objects. It is often convenient to omit the parameters in all of the predicates. Quantifiers are also omitted as they can be easily inferred from the context (join and leave are user operations, add and remove are object operations).

Four constraints are disclosed to ensure that a trace is well formed, as follows:

2.2.1. Constraint A

An object cannot be Added and Removed and a user cannot Join and Leave at the same time.[1]

[1]Note that here and below we introduce names of the form $\tau_j$ for each of the formulas for later reference. The equality introduces shorthand for the respective formulas.

$$\tau_0=\square(\neg(Add\wedge Remove)\wedge\neg(Join\wedge Leave))$$

2.2.2. Constraints B

For any given user or object, two types of operations cannot occur at the same time.

$$\tau_1=\forall_{i,j}\square((i\neq j)\rightarrow\neg(join_i\wedge join_j))\wedge\forall i,j\square((i\neq j)\rightarrow\neg(leave_i\wedge leave_j))\wedge$$

$$\forall i,j\square((i\neq j)\rightarrow\neg(add_i\wedge add_j))\wedge\forall i,j\square((i\neq j)\rightarrow\neg(remove_i\wedge remove_j))$$

For example, a user cannot join with 2 different semantics in the same state. Multiple occurrences of the same event in a given state (i.e. when i equals j above) are treated as a single occurrence of that event in FOTL.

2.2.3. Constraint C

If a user u joins a group, u cannot join again unless u first leaves the group. Similar rules apply for other operations.

$$\tau_2=\square(Join\rightarrow\bigcirc(\neg Join\ \mathcal{W}\ Leave))\wedge\square(Leave\rightarrow\bigcirc(\neg Leave\ \mathcal{W}\ Join))\wedge$$

$$\square(Add\rightarrow\bigcirc(\neg Add\ \mathcal{W}\ Remove))\wedge\bigcirc(Remove\rightarrow\bigcirc(\neg Remove\ \mathcal{W}\ Add))$$

2.2.4. Constraint D

A Leave event cannot occur before Join. Similarly for objects.

$$\tau_3=\square(Leave\rightarrow\blacklozenge Join)\wedge\square(Remove\rightarrow\blacklozenge Add)$$

In any given trace, an object needs to be added before a remove operation may occur in any state.

3. The Stateless π-System G-SIS Specification

The π-system specification supports two types of semantics for join, leave, add and remove operations namely: strict and liberal.

A strict join (SJ) allows the joining user to access only those objects added on or after the state in which the user joins (called the "join state"). A liberal join (LJ), in addition, allows the joining user to access objects added to the group prior to the join state.

On strict leave (SL), the user loses access to all objects in the group. On liberal leave (LL), the user retains access to all objects that were authorized in the state when the user left (called the "leave state").

Similarly, for objects, on strict add (SA), the added object may be accessed only by users who have joined at or prior to the state in which the object is added to the group (called the "add state"). Liberal add (LA) does not have such a constraint.

On strict remove (SR), the object cannot be accessed by any user. On liberal remove (LR), the object may be accessed by users who were authorized to access the object in the state where the object was removed (called the "remove state").

Given that different users may join and leave with different semantics and different objects may be added and removed with different semantics, the π-system specifies the precise conditions under which authorization for a user to access an object in a group may hold in the system.

Definition 3 (Stateless π-system). The stateless π-system specification, $\pi_{stateless}$, accepts traces satisfied by the following formula:

$$\forall u.\forall o.\forall g.\Box(Authz(u, o, g, \text{read}) \leftrightarrow \lambda_1 \vee \lambda_2) \bigwedge_{0 \le j \le 3} \tau_j$$

where, $$\lambda_1 = ((\neg SL \wedge \neg SR)\,\mathcal{S}\,((SA \vee LA) \wedge ((\neg LL \wedge \neg SL)\,\mathcal{S}\,(SJ \vee LJ))))$$

$$\lambda_2 = ((\neg SL \wedge \neg SR)\,\mathcal{S}\,(LJ \wedge ((\neg SR \wedge \neg LR)\,\mathcal{S}\,LA)))$$

and the $\tau_j$'s are the well-formedness constraints.

Given a specific user and an object, formula $\lambda_1$ (FIG. 1) handles the scenario where an add operation occurs after a join operation and formula $\lambda_2$ (FIG. 2) handles the scenario where an add operation occurs before a join operation. (Here, because of the semantics of the strict add and strict join, there is no need to check for their occurrence in formula $\lambda_2$).

The stateless specification above is consistent with the semantics of strict and liberal operations discussed earlier. In addition, a set of core security properties are specified that are required of any g-SIS specification. The stateless Ir-system specification discussed above satisfies those core properties.

Although g-SIS stateless specification supports both read and write operations this disclosure discusses a stateless specification for read authorization as an exemplary embodiment. Those having skill in the art will readily appreciate that the identical methods can be used to specify write authorization.

4. Stateful π-System

The stateless specification is highly abstract and specified using FOTL. The stateful specification, in contrast, is concrete and may be implemented by a reasonably competent programmer.

The stateful specification is "reasonably" authorization equivalent to the stateless specification. "Reasonable" authorization equivalence is achieved because, while theoretically identical, practical distributed systems face real-world issues such as network delay and caching, which will lead to authorization inconsistencies

TABLE 2

Stateful Specification (Request Handling)

```
main( ){
    // Phase 1 and 2 time periods below are allocated such that phase 1 occurs before
    // phase 2 and tasks in perTick step below conclude before the tick interval elapses.
    perTick: During each tick interval i {
        Phase 1:{ // Steps 1.1, 1.2 and 1.3 may execute concurrently.
            1.1. For each user, accept the first request received and
            store that information in variable userReq(u,g).
            // the request received could be one of:
            // SJReq(u,g), LJReq(u,g), SLReq(u,g) and LLReq(u,g).
            1.2. For each object, accept the first request received and
            store that information in variable objectReq(o,g).
            // the request received could be one of:
            // SAReq(o,g), LAReq(o,g), SRReq(o,g) and LRReq(o,g).*/
            1.3. Accept all the authorization requests:
                if (isAuthz(u,o,g)) authzReq=authzReq ∪ isAuthz(u,o,g)
                // isAuthz(u,o,g) represents authorization request for user u to access object o.
        }
        Phase 2:{ // Steps 2.1 and 2.2 must be sequential. However, the processing of
            // captured requests in step 2.1 may be done concurrently.
            2.1. For each captured request, invoke the corresponding function in
            table 3 with the appropriate parameters.
            // for example, if userReq(u,g) is SJReq(u,g), invoke userEvent(u,g,join,i,strict).
            2.2. Process each authorization request:
                for each (isAuthz(u,o,g) ∈ authzReq)
                    authzResult(u,o,g)=authzSF(u,o,g);
        }
        Reset all variables appropriately.
    }
}
```

with the idealized stateless specification. Such systems are in practice only approximate to the stateless specification. One such approximation is the notion of stale-safety (known in the art) that bounds acceptable delay between the time at which an action (such as reading an object) was known to be authorized and the time at which that action is actually performed.

As the first transition from an abstract specification towards an implementable specification, the stateful specification is centralized in the sense that authorization decisions are made based on data structures maintained in a specific repository for each user and object. There may be different repositories for different users and objects that may be distributed on the whole. Specifically, there is no concern about replication of data structures of a user or an object and maintenance

TABLE 3

| Stateful Specification (enforcing well-formedness constraints.) |
| --- |
| int userEvent(User u, Group g, uEvent e, interval t, uSemantics s){ |
| 1. Check that the current uEvent e is not the same as the uEvent value in the previous tuple in table(u,g). If so, return 0. |
| // This ensures, for example, that a join event is not followed |
| // immediately by another join. |
| 2. Also check, in case the table is empty, then e is not an SL or LL. If so, return 0. |
| // This ensures that the first user event entry in table(u,g) is not leave. |

TABLE 3-continued

| Stateful Specification (enforcing well-formedness constraints.) |
| --- |
| 3. Enter <t,e,s> into table(u,g) and return 1. |
| } |
| int objectEvent(Object o, Group g, oEvent e, interval t, oSemantics s){ |
| 1. Check that the current oEvent e is not the same as the oEvent value in the previous tuple in table(o,g). If so, return 0. |
| // This ensures, for example, that an add event is not followed |
| // immediately by another add. |
| 2. Also check, in case the table is empty, then e is not an SR or LR. If so, return 0. |
| // This ensures that the first object event entry in table (o,g) is not remove. |
| 3. Enter <t,e,s> into table(o,g) and return 1. |
| } |

of its consistency. There is also no concern about distributing parts of the data structure of a user or an object. Authorization decisions for a specific user to access a specific object are made based on their specific data structures maintained at specific repositories.

The stateless specification does not admit traces of actions that do not obey the well-formedness constraints. It therefore intentionally does not specify how to handle ill-formed traces. But at the stateful specification level of abstraction, well-formedness needs to be addressed.

4.1. Stateful π-System Design

In the stateful π-system, the data structures for making authorization decisions are simple relations for users and objects in the group. These are referred to informally as tables. For instance, the data structure for a user u in a group g, table(u,g), contains a history of that user's joins and leaves in the group. (The group parameter g is specified for being precise. This is ignored for the remainder of this disclosure, which focuses only on one group at any time.) The format of each tuple in table(u,g) is: <time-stamp, event, semantics>. Here event is either

TABLE 4

| | Stateful Specification (Authorization Decision) |
| --- | --- |
| | int authzSF(User u, Object o, Group g){ |
| step 1: | Fetch tables table(u,g) and table(o,g). If either table is empty, return 0. |
| | Merge sort table(u,g) and table(o,g) in ascending order of timestamp. |
| | In case of same timestamp, follow precedence rules apply: |
| | (i) Add and Join same timestamp: Add follows Join |
| | (ii) Join and Remove same timestamp: Join follows Remove |
| | (iii) Add and Leave same timestamp: Add follows Leave |
| | (iv) Remove and Leave same timestamp: any order |
| | Let n be the total number of entries in the merged table. |
| step 2: | for i=1 to n{ |
| | case event[i]=join{ |
| step 2a: | (i) Step down the table looking for an add event. If a leave event is encountered prior to add event, continue step 2 for loop. If no add event found, return 0. |
| | (ii) From the point the add event was found in the table, step down all the way to index n ensuring no SL or SR is encountered. |
| | If SL found, continue step 2. If SR found, continue step 2a from current index. |
| | (iii) return 1; |
| | } |
| | case event[i]=add && eventType[i]=liberal{ |
| step 2b: | (i) Step down the table looking for an LJ event. If a remove event is encountered prior to LJ event, continue step 2 for loop. If no LJ event found, return 0. |
| | (ii) From the point the LJ event was found in the table, step down all the way to index n ensuring no SL or SR is encountered. |
| | If SR found, continue step 2. If SL found, continue step 2b from current index. |
| | (iii) return 1; |
| | } |
| | } |
| step 3: | return 0; |
| | } |

join or leave, semantics is either strict or liberal and timestamp specifies the time at which this event occurred as per a global clock. Thus a snapshot of table(u,g) at any point in time gives a chronological history of the user joining and leaving (possibly many times) and whether they were of strict or liberal type. Similarly, a tuple in an object data structure, table(o,g), has the same format as the user table except event is either add or remove. In the exemplary embodiment, the number of tuples in any table is not bounded. This can be advantageous. For example, it facilitates user data structures not being touched when an object data structure needs to be updated (and vice-versa). Of course, there are other data structure designs where they may be bounded.

The stateful specification for the π-system is presented in tables 2, 3 and 4. The authzSF function in table 4 returns 1 if a user u is authorized to access an object o, 0 otherwise. It does so by inspecting the data structures: table(u,g) and table(o,g). As mentioned earlier, the stateful π-system must also specify how the requests to join, leave, add and remove and requests to ascertain if users are authorized to read objects are processed. Tables 2 and 3 specify one of many possible ways to do this.

Each of these three components of the stateful π-system is discussed in further detail below.

4.2. Stateful π-System Specification

Figure 2:
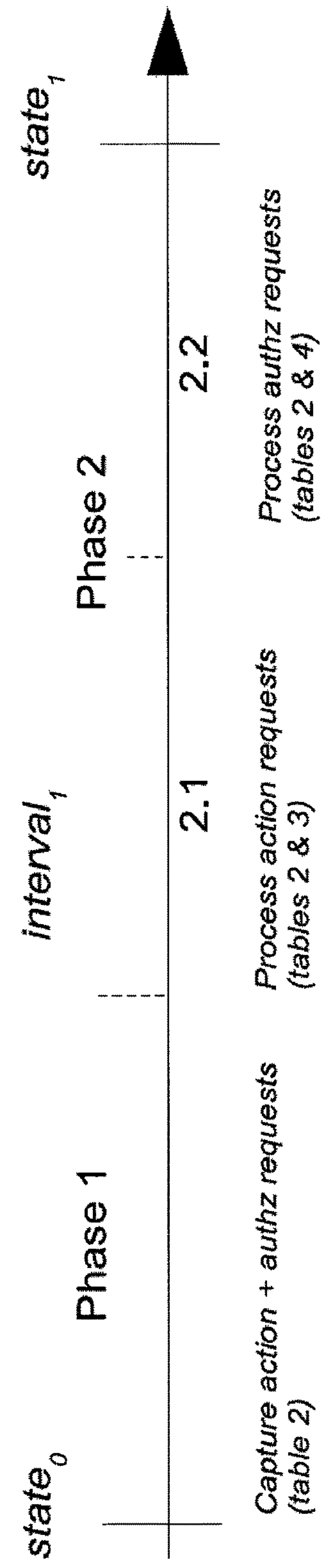
FIG. 2 is a time-domain diagram of operations in a stateful security policy implementation.

An overview of how the functions in the tables 2, 3 and 4 interact is given in FIG. 2.

The main function in table 2 receives and processes action requests (requests to join, leave, add and remove) and authorization requests during the time interval between any two clock ticks. The function works in two phases during each time interval. During phase 1, it receives the action and authorization requests. It filters the action requests so that only the first user request and the first object request are captured. (Different strategies for capturing action requests may be employed—e.g. it need not be the first request received that is captured.) This ensures, for instance, that only a join or a leave request of a specific type (strict or liberal) is captured for any given user but not both.

However, all authorization requests are captured during phase 1. When phase 1 completes, further new requests are not admitted. During phase 2, first all action requests received in phase 1 are processed using the user and object event processing functions in table 3 and then all the captured authorization requests are evaluated using authzSF function in table 4. At the end of phase 2, the data structures are up-to-date and authorization decisions are complete for all the requests received in phase 1.

The function userEvent in table 3 processes the user requests received by the function in table 2. The check performed in step 1 ensures that user requests to repeatedly join without an intermittent leave (and vice-versa) are ignored. Similarly, step 2 ensures that the first entry in the table does not begin with a leave operation. If all is well, a new tuple is entered into the table and the function returns 1. The function returns 0 in all other cases. The objectEvent function similarly processes object requests. Tables 2 and 3 together achieve well-formedness constraints of stateless π-system specification.

The function authzSF in table 4 returns 1 if a user u is authorized to access an object o in group g, 0 otherwise. This algorithm begins by taking the corresponding user and object tables as input. If either table is empty (i.e., either the user or the object has never been a member of the group), the user is not authorized to read the object. By appending the tuples to the respective tables as the events occur, table(u,g) and table(o,g) are pre-sorted with respect to the time-stamp. The function merge sorts these two tables based on the time-stamp entries to obtain a table of events of u and o in the chronological order of occurrence. In the event a user and object entry in the respective tables have the same time-stamp, precedence rules resolve the tie for sorting the tuples consistent with temporal operator semantics in the stateless π-system. If Add and Join occur at the same time, Add follows Join. If Join and Remove occur at the same time, Join follows Remove. If Add and Leave occur at the same time, Add follows Leave. Finally, if Remove and Leave occur at the same time, they can be merge sorted in any order. Let the total number of entries in the merged table be n.

The algorithm proceeds by iterating through each tuple in this new merge sorted table. Event[i] fetches the specific event (such as join or add) from the $i^{th}$ entry in the merged table and eventType[i] fetches the respective semantics (such as strict or liberal) of that event from the same tuple. Each of the two cases in the for loop looks for an overlapping period of authorizing membership between the user and object, much like formulas $\lambda_1$ and $\lambda_2$. The first case looks for a join event followed by an add event (see Formula $\lambda_1$ (FIG. 1)) and the second case looks for an add event followed by a join event (see Formula $\lambda_2$ (FIG. 1)). As per $\lambda_2$, the second case looks for a liberal add followed by a liberal join. The remaining part of the case statements conduct checks to ensure that there is no subsequent deauthorizing event such as strict leave or remove following this point of authorization. If there is none, the algorithm returns 1 indicating that the user is authorized. Otherwise it returns 0 after step 3.

4.3. Implementation Considerations

The stateful specification presented in tables 2, 3 and 4 can be comprehended and implemented by a competent programmer as compared to the temporal logic based stateless specification. Since the stateless specification has been analyzed and certain security properties have been proven and has been shown to be authorization equivalent to the stateful specification, the stateful specification also is guaranteed to have those security properties.

The authzSF function in table 4 is not designed for efficiency but for ease of presentation. Those having skill in the art will recognize that it can be optimized using techniques known in the art. The worst case time complexity of this function is roughly $\mathcal{O}(n^2)$ where n is the sum of the number of events in the user and object tables. This is because for each of the n iterations of the outer for loop in step 2, the loops in one of the inner case statements could run through a maximum of n iterations.

This stateful specification has a few limitations. For instance, both the user and object tables are unbounded. Nevertheless, this is not a major issue in many practical applications in which membership status of users and objects do not change frequently. Also, due to nature of phases 1 and 2 in table 2, all action requests need to be received before they can be processed. Thus during phase 2 of interval, no requests will be accepted. The ordering of tasks in two phases ensures that the requests received during the time interval will affect the authorization values that hold at the upcoming state. These constraints may be unacceptable for certain application scenarios. Addressing such limitations of the stateful specification is within the abilities of those having skill in the art. The current stateful specification design allows user and object data structures to be maintained in a distributed manner so that if a user membership status changes, it does not require updating data structures of other users and objects in the system. Those having skill in the art may design alternate stateful specifications for the same stateless specification with different trade-offs. For instance, one can maintain a single data structure that involves both users and objects. But changes in any object's group membership status will entail updating entries for all users in the system. This would have limitations in distributing it.

5. Equivalence of Stateful and Stateless π-System Specifications

This section shows that the stateful specification is authorization equivalent to the stateless specification. That is, in all possible traces, a user will be authorized to access an object at any given state in the stateful π-system if and only if it is also the case in the stateless π-system.

The stateful specification has a notion of traces similar to the traces of the stateless specification.

Definition 4 (State in Stateful Specification). A state in the stateful specification is a specific interpretation of every user and object data structure maintained in the system at the end of every clock tick.

Definition 5 (Stateful Trace). A trace in the stateful specification is an infinite sequence of states.

Definition 6 (Stateful π-system). The stateful r-system specification, $\pi_{stateful}$, is given in table 2 which consists of functions from tables 3 and 4.

Given a stateless and a corresponding stateful trace, authorization is equivalent in every state. To establish this "correspondence," mappings are disclosed that would take a stateless trace and create a stateful trace and vice-versa.

5.1. Notation $\sigma$ denotes a stateless trace and $\hat{\sigma}$ denotes a stateful trace. $\sigma_i$ refers to state i in a trace $\sigma$ with infinite states. $\sigma_{i,j}$ denotes a state i in a where only the first j states are considered. Actions are represented using relations. Thus $\langle u,g\rangle \in\in [\![SJ_{stateless}]\!]\sigma_i$ denotes that a user u is strictly joined to group g in state i in a stateless trace $\sigma$. Similarly, $\langle i, Join, Liberal\rangle \in [\![table(u,g)\mathcal{S}\hat{\sigma}_i$ denotes user u has liberally joined group g in state i in a stateful trace $\hat{\sigma}$.

The time interval that a clock tick corresponds to is abstract. Any event request (such as a request to join) that is processed during a transition from clock tick (state) i to i+1 will receive a time-stamp of i+1. This convention makes stateful specification consistent with the FOTL semantics in the stateless specification.

Definition 7 (Action Trace). Given a stateless or stateful trace in the π-system, an action trace is a sequence of states excluding the authorization relation.

Definition 8 (Action Equivalence). A stateful trace $\hat{\sigma}$ and a stateless trace $\sigma$ are action equivalent if the join, leave, add and remove actions match for every user and object in every group in the corresponding states in $\hat{\sigma}$ and $\sigma$.

Definition 9 (α-mapping). Given a stateless trace $\sigma$ in $\pi_{stateless}$, α-mapping creates an action equivalent stateful trace $\sigma$ in $\pi_{stateful}$.

Rules used for α-mapping are straight-forward. For example (see FIG. 3), for each $\langle u,g\rangle \in [\![SJ_{stateless}]\!]\sigma_i$, create an entry $\langle i, Join, Strict\rangle$ in $[\![table(u,g)]\!]\hat{\sigma}_i$.

This is achieved by sending a SJReq(u,g) (see table 2) during phase 1 in the time interval between the state transition from $\hat{\sigma}_{i-1}$ to $\hat{\sigma}_i$. Similarly, for each $\langle u,g\rangle \in [\![LJ_{stateless}]\!]\sigma_i$, create an entry $\langle i, Join, Liberal\rangle$ in $[\![table(u,g)]\!]\sigma_i$. Similar rules apply to other predicates.

Definition 10 (β-mapping). Given a stateful trace $\hat{\sigma}$ in $\pi_{stateful}$, β-mapping creates an action equivalent stateless trace $\sigma$ in $\pi_{stateless}$.

Rules used for β-mapping are also straight-forward. For example (see FIG. 3), for each tuple in $[\![table(u,g)]\!]\hat{\sigma}_i - [\![table(u,g)]\!]\hat{\sigma}_{i-1}$, create that entry in corresponding relation in the stateless trace. That is if $\langle i, Join, Strict\rangle \in [\![table(u,g)]\!]\hat{\sigma}_i - [\![table(u,g)]\!]\hat{\sigma}_{i-1}$, then create an entry $\langle u,g\rangle$ in $[\![SJ_{stateless}]\!]\sigma_i$. Similarly, for each $\langle i, Join, Liberal\rangle \in [\![table(u,g)]\!]\sigma_i$, create an entry $\langle u,g\rangle$ in $[\![LJ_{stateless}]\!]\sigma_i$. Similar rules apply to other operations in the stateful specification.

Lemma 1. For every action trace $\sigma$ that is generated by $\pi_{stateless}$, a stateful action trace $\hat{\sigma}$ constructed using α-mapping is accepted by $\pi_{stateful}$.

Figure 3:
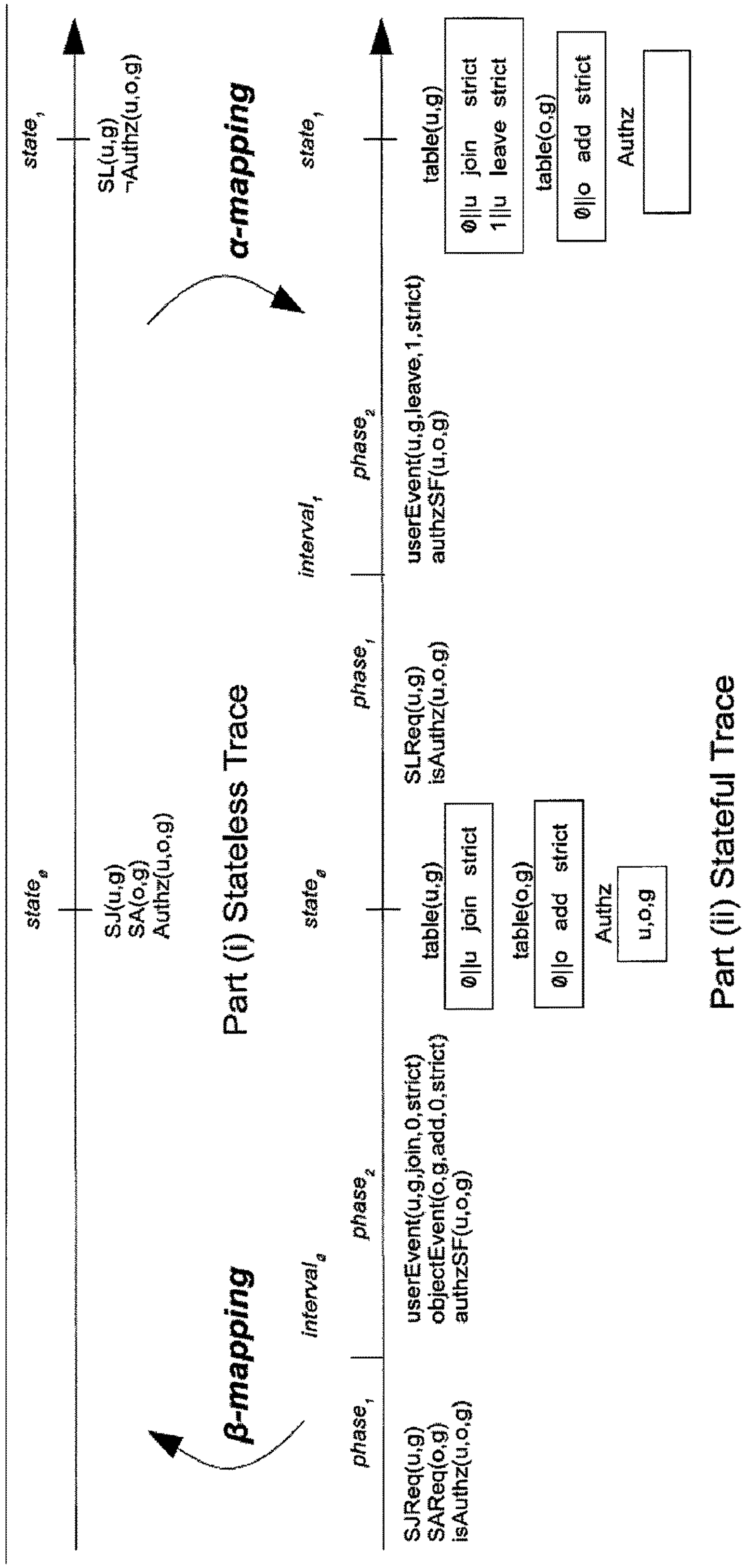
FIG. 3 is a diagrammatic representation of mapping between a stateless security specification and an authorization-equivalent stateful security specification.
Figure 4:
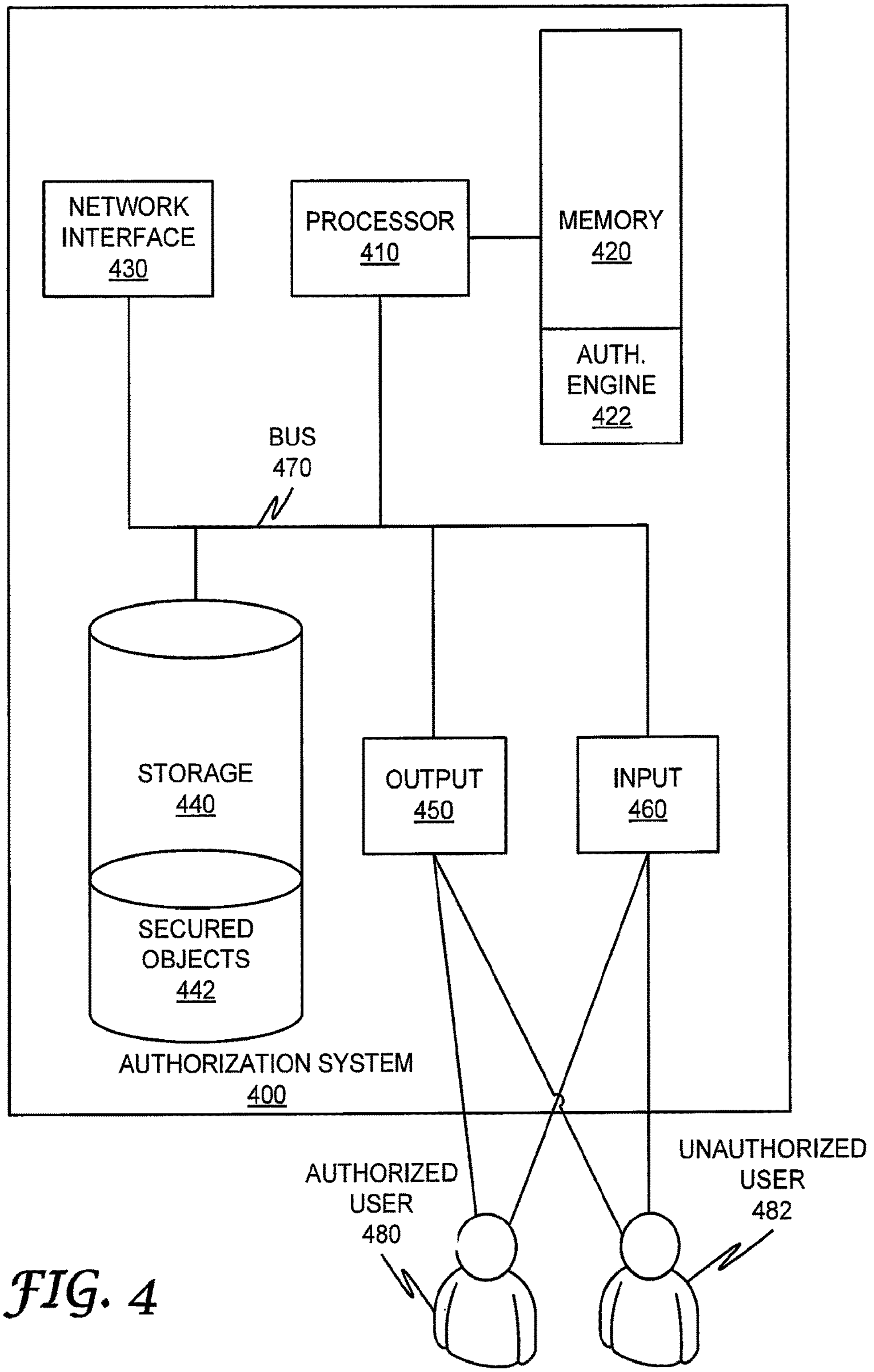
FIG. 4 is a block diagram of a hardware implementation of an authorization system.

The term "accepted by" above, means that by inputting an α-mapped trace to the stateful π-system, the data structure it maintains must reflect the exact action trace of the stateless π-system (see FIG. 3 for example).

Lemma 2. For every action trace $\hat{\sigma}$ generated by $\pi_{stateful}$, a stateless action trace constructed using β-mapping is accepted by $\pi_{stateless}$.

The term "accepted by" above means that the β-mapped stateless action trace will be well-formed as per the stateless π-system specification. The proofs of lemmas 1 and 2 are provided in the appendix. Next, we have the following 2 lemmas.

Lemma 3 (Soundness). For every trace $\hat{\sigma}$ accepted by $\pi_{stateful}$, there exists a β-mapped trace $\sigma$ that is accepted by $\pi_{stateless}$ such that:

$$\forall i \in \mathbb{N} \cdot \forall t \in \langle \mathcal{U}, \mathcal{O}, \mathcal{G}\rangle \cdot t \in [\![Authz_{\pi_{stateful}}]\!]\hat{\sigma}_i \rightarrow t \in [\![Authz_{\pi_{stateless}}]\!]\sigma_i$$

Lemma 4 (Completeness). For every trace $\sigma$ accepted by $\pi_{stateless}$, there exists an α-mapped trace $\hat{\sigma}$ that is accepted by $\pi_{stateful}$ such that:

$$\forall i \in \mathbb{N} \cdot \forall t \in \langle \mathcal{U}, \mathcal{O}, \mathcal{G}\rangle \cdot t \in [\![Authz_{\pi_{stateful}}]\!]\sigma_i \rightarrow t \in [\![Authz_{\pi_{stateless}}]\!]\hat{\sigma}_i$$

The proofs for lemmas 3 and 4 are provided in the appendix. The proofs are inductive.

Theorem 1. The stateful and stateless π-system specifications are authorization equivalent That is:

$$\forall i \in \mathbb{N} \cdot \forall t \in \langle \mathcal{U}, \mathcal{O}, \mathcal{G}\rangle \cdot t \in [\![Authz_{\pi_{stateful}}]\!]\hat{\sigma}_i \leftrightarrow t \in [\![Authz_{\pi_{stateless}}]\!]\sigma_i$$

Proof 1. The theorem follows from lemmas 3 and 4.

The above theorem states that in every state in a stateful trace, the authorization relation is equivalent to that of the corresponding state in a stateless trace.

6. Hardware Implementation

FIG. 2 is a block diagram of a user authorization system 400. The purpose of user authorization system 400 is to protect secured objects 442 stored in storage 442 by granting access to the secured objects 442 to an authorized user 480 and denying access to an unauthorized user 482. The exemplary layout of authorization system 420 is presented as a set of logical interconnections and does not represent physical connections. For example, processor 410 is shown connecting to storage 440 via bus 470, but in some exemplary embodiments, a process 410 implementing an authorization engine 422 may be located in a completely separate physical computing device from storage 440, and there may be additional intervening layers of hardware and software.

Authorization system 420 is controlled by a processor 410, which may be connected to other system components via a bus 470. Processor 410 may be a microprocessor or microcontroller or other similar programmable or custom logic device, such as a field-programmable gate array, application-specific integrated circuit, or programmable logic array. Processor 410 interfaces with a memory 420, which in an exemplary embodiment is low-latency random access memory. Memory 420 may also be embodied as other memory technologies, such as flash, read-only memory, or other data storage media. Memory 420 is shown connected to processor 410 in a "direct memory access" (DMA) configuration, but in some embodiments may be connected to processor 410 via bus 470. Memory 420 has residing therein an authorization engine 422. Authorization engine 422 includes executable software instructions for execution by processor 410, and implements the authorization methods described in this specification. For example, authorization engine 422 may have programmed therein a security policy for determining whether a user is permitted to access secured objects 442 under certain contexts.

A network interface 430 is also provided so that authorization system 400 may be networked to other computing devices. Network interface 430 may also represent a security threat as it increases access to resources controlled by authorization system 442.

A data storage 440 is provided, and in some embodiments may include a higher-volume and higher-latency memory technology than memory 420. Storage 440 may comprise at least one non-volatile storage medium while memory 420 may be a volatile storage medium. For example, storage 440 may include hard disk technology, while memory 420 may include dynamic random access memory (DRAM) technology. In the exemplary embodiment, But it is expressly anticipated by this specification that in some cases, storage 440 and memory 420 may be combined in a single physical device. Storage 440 may have stored therein secured objects 442, which may be any type of data, and which in some embodiments may be encrypted or otherwise obfuscated.

Users 480, 482 interact with the authorization system via input driver 460 and receive output via output driver 450. Input driver 460 and output driver 462 may include any of numerous human interface devices known in the art, including for example keyboards, mice, speech recognition, text-to-speech engines, displays, and audio drivers. Input driver 460 may also include authentication mechanisms, such as a password input, card or other security token reader, or biometric input device such as fingerprint, voice, or retinal recognition.

In an exemplary interaction, authorized user 480 uses input driver 460 to try to access secured objects 442. The interaction may further comprise authorized user 480 providing one or more security tokens such as a password, key phrase, decryption key, or biometric data. Processor 410 accesses authorization engine 422 in memory 420 and determines that in the present context, authorized user 480 is permitted to access secured objects 442. Process 410 may then provide secured objects 442 to authorized user 480 in a usable form. For example, secured objects 442 may be decrypted and provided to authorized user 480 in a usable form.

In another example, unauthorized user 482 tries to use input driver 460 to access secured objects 442, which may include providing unacceptable security tokens. Processor 410 accesses authorization engine 422 to determine that unauthorized user 482 is not permitted to access secured objects 442 in the given context. Processor 410 does not provide unauthorized user 482 with secured objects 442, and may provide an error message. In some embodiments, processor 410 may also report (for example, via network interface 430) that an unauthorized access attempt was made.

7. Appendix of Proofs

Lemma 1. For every action trace $\sigma$ that is generated by $\pi_{stateless}$, a stateful trace $\hat{\sigma}$ constructed using $\alpha$-mapping is accepted by $\pi_{stateful}$.

Proof 2. We need to show that every well-formed trace generated by $\pi_{stateless}$ will also be generated by $\pi_{stateless}$. Fix an arbitrary well-formed stateless trace $\alpha$.

Basis: For every $\pi_{stateless}$ trace $\sigma$ of length 1, there exists an $\alpha$-mapped $\pi_{stateless}$ trace $\hat{\sigma}$ of length 1. For each event in $\sigma_{1,1}$, we generate a corresponding event request from table 2 during phase 1 in the time interval leading up to $\hat{\sigma}_{1,1}$ and show that the request will be accepted by the corresponding function in table 3. If the set of events in $\sigma_{1,1}$ is empty, it is trivial to generate a $\hat{\sigma}_{1,1}$ with empty user and object tables. Fix an arbitrary user u and object o. The event in the first state in $\sigma$ cannot be a leave or remove for these carriers. Thus the only possible events for these carriers are strict or liberal join and/or strict or liberal add. For each such event, we generate a corresponding request event in the previous interval. For example, if $\langle u,g\rangle \in [\![ SJ ]\!] \sigma_{1,1}$, we generate a SJReq(u,g) in the interval leading up to state 1. Inspecting table 3, it is clear that we can generate a well-formed $\hat{\sigma}_{1,1}$ for any number of users and objects in the first state since the functions userEvent and objectEvent enforce that a trace in $\pi_{stateless}$ do not begin with leave or remove for any user or object.

Induction Hypothesis: For every $\pi_{stateless}$ trace of length k, there exists an $\alpha$-mapped $\pi_{stateless}$ trace of length k.

Induction Step: Assuming the induction hypothesis is true, for every $\pi_{stateless}$ trace of length k+1 there exists a $\pi_{stateless}$ trace of length k+1.

Given a well-formed trace $\sigma$ of length k, consider the set of actions that can belong to a state that can be appended to $\sigma$ to create a trace of length k+1 such that it would be well-formed. Fixing an arbitrary user u, an event of type join (SJ or LJ) can occur in $\sigma_{k+1}$ only if there has not been a join event since a state $\sigma_p$ (where p≤k) in which an event of type leave (SL or LL) had occurred. Also, there cannot be a simultaneous leave event in $\sigma_{k+1}$.

Given this observation, if we generate a join request with appropriate parameters in table 2 (e.g. SJReq(u,g)) in phase I in the time interval between $\hat{\sigma}_k$ and $\hat{\sigma}_{k+1}$, the userEvent function in table 3 will update the user's table with a corresponding entry (e.g. $\langle$ k+1||u,join,strict$\rangle$ ) in $\hat{\sigma}_{k+1}$. This is because given a well-formed trace in $\pi_{stateful}$ with the above constraints in the corresponding $\pi_{stateless}$ trace, the userEvent function will obey the join request.

Similar argument applies to other operations that could have occurred in $\sigma_{k+1}$. This proves the induction step and hence the lemma.

Lemma 2. For every action trace $\hat{\sigma}$ generated by $\pi_{stateless}$, a stateless action trace constructed using $\beta$-mapping is accepted by $\pi_{stateless}$.

Proof 3. We need to show that for every trace generated by $\pi_{stateless}$, an action equivalent $\pi_{stateless}$ trace constructed using $\beta$-mapping will be well-formed and hence accepted by $\pi_{stateless}$.

Basis: Consider a $\pi_{stateless}$ trace $\hat{\sigma}$ of length 1. As per the functions specified in table 3, the events in $\hat{\alpha}_{1,1}$ could only be of type join or add. Evidently, a corresponding $\pi_{stateless}$ action trace generated using $\beta$-mapping would be well-formed. (The argument is similar to that of the basis in lemma 1.)

Induction Hypothesis: For every $\pi_{stateless}$ trace of length k, there exists an action equivalent $\pi_{stateless}$ trace of length k that is well-formed.

Induction Step: Assuming the induction hypothesis is true, for every $\pi_{stateless}$ trace of length k+1, there exists a $\pi_{stateless}$ trace of length k+1 that is well-formed.

Given a set of new tuples that will be entered in $\hat{\sigma}_{k+1,k+1}$, it is straight-forward to generate a trace $\sigma_{k+1}$ using $\beta$-mapping. This has to be a well-formed trace in $\pi_{stateless}$. (The argument for this similar to that of the induction step in lemma 1.) This proves the lemma.

Lemma 3 (Soundness). For every trace $\hat{\sigma}$ accepted by $\pi_{stateless}$, there exists a $\beta$-mapped trace $\sigma$ that is accepted by $\pi_{stateless}$ such that:

$$\forall i \in \mathbb{N} \cdot \forall t \in \langle \mathcal{U}, \mathcal{O}, \mathcal{G} \rangle \cdot t \in [\![ \text{Authz}_{\pi_{stateful}} ]\!] \hat{\sigma}_i \rightarrow t \in [\![ \text{Authz}_{\pi_{stateless}} ]\!] \sigma_i$$

Proof 4. We prove this lemma using mathematical induction. We apply induction on i, the number of states in the trace $\hat{\sigma}$ in $\pi_{stateless}$.

Basis: Show that the lemma holds for i=1.

We limit our discussion with respect to users and objects in a specific group for simplicity. The arguments can be easily extended to multiple groups.

Consider a one state trace in $\pi_{stateless}$. If the set of events in this state is empty, then the user and object tables are empty. For each user and object in each group, the authzSF function will return 0 at step 1. Thus the authorization relation $[\text{Authz}_{\pi_{stateful}}]\hat{\sigma}_{1,1}$ is empty. Similarly, in $\pi_{stateless}$, formulas $\lambda_1$ and $\lambda_2$ will evaluate to false for each user and object in each group if no events have occurred. Thus $[\text{Authz}_{\pi_{stateful}}]\hat{\sigma}_{1,1}$ is also empty.

Next fix an arbitrary set of user and object events that could have occurred in the initial state. Note that as per lemma 2 there can be at most one event per user and at most one event per object in this state in $\pi_{stateless}$. If there is not a single user event in this set, authorization relations in both $\pi_{stateless}$ and $\pi_{stateless}$ will be empty. The same result follows if there is not a single object event in that set. Now consider an event set with a mix of non-empty user and object events. Fix an arbitrary user and object event in this set. Since this is the first state, the user event could be a SJ or LJ and the object event could be a SA or LA. As per the userEvent and objectEvent functions and lemma 2, the initial state cannot contain a disabling event such as leave or remove. Next, note that for each user and object event pair from above, the authzSF function returns 1. This is because the merge sort operation in step 1 in authzSF places the object event following the user event if both the user and object events occurred in the same state. The table created from merge sort is of length 2 (i.e., n=2) with the user entry followed by the object entry. In this case, the function returns 1 from step 2a. Consider a one state stateless trace with an arbitrary set of user and object events. If the set of user or object events is empty in the above set, both $\lambda_1$ and $\lambda_2$ will evaluate to false. Thus the authorization relation in $\pi_{stateless}$ will also be empty. Now fix the same user and object considered in the stateful specification above. For this pair it is easy to see that either $\lambda_1$ or $\lambda_2$ will trivially evaluate to true regardless of the event semantics since they are both enabling events and happen at the same state. As a result, the authorization relation in $\pi_{stateless}$ will contain this specific user and object tuple.

Based on the argument above, it is clear that for all one state length traces of $\pi_{stateless}$ and $\pi_{stateless}$, a tuple exists in the authorization relation in that state in $\pi_{stateless}$ only if it also exists in the authorization relation in that state in $\pi_{stateless}$. Thus the basis is proved.

Induction Hypothesis: For every trace $\hat{\sigma}$ of length k in $\pi_{stateless}$, there exists a trace $\sigma$ of length k in $\pi_{stateless}$ such that $\hat{\sigma}$ and $\sigma$ are authorization equivalent. (Note that a trace of length k means that the trace has k states.)

$$\forall k \in \mathbb{N} \cdot \forall i \leq k \cdot \in \langle \mathcal{U}, \mathcal{O}, \mathcal{G} \rangle \cdot t \in$$
$$[\text{Authz}_{\pi_{stateful}}]\hat{\sigma}_{i,k} \rightarrow t \in [\text{Authz}_{\pi_{stateless}}]\sigma_{i,k}$$

where $\sigma_{i,k}$ indicates a state i in a trace $\sigma$ with k states.

Induction Step: Assuming that all $\pi_{stateless}$ and $\pi_{stateless}$ specifications are authorization equivalent for all traces of length k, prove the same for traces of length k+1. Consider the set of user and object events in the k+1$^{th}$ state in $\pi_{stateless}$. If this set is empty, it means that the tables of all users and objects in the system are unchanged from k to k+1. If the tables are unchanged from state k to k+1, the authorization relations are unchanged from k to k+1 in $\pi_{stateless}$. This is trivially true of $\pi_{stateless}$ as well.

Now consider a non-empty set of user and/or object events. Fix an arbitrary user u, object o and group g. There are four ways in which the Authz$_{stateful}$ relation could change from k to k+1 in the stateful specification with respect to the fixed u, o and g:

1. $\langle u,o,g \rangle \in [\text{Authtz}_{stateful}]\hat{\sigma}_{k,k+1} \wedge \langle u,o,g \rangle \notin [\text{Authz}_{stateful}]\hat{\sigma}_{k+1,k+1}$
2. $\langle u,o,g \rangle \in [\text{Authtz}_{stateful}]\hat{\sigma}_{k,k+1} \wedge \langle u,o,g \rangle \in [\text{Authz}_{stateful}]\hat{\sigma}_{k+1,k+1}$
3. $\langle u,o,g \rangle \notin [\text{Authtz}_{stateful}]\hat{\sigma}_{k,k+1} \wedge \langle u,o,g \rangle \notin [\text{Authz}_{stateful}]\hat{\sigma}_{k+1,k+1}$
4. $\langle u,o,g \rangle \notin [\text{Authtz}_{stateful}]\hat{\sigma}_{k,k+1} \wedge \langle u,o,g \rangle \notin [\text{Authz}_{stateful}]\hat{\sigma}_{k+1,k+1}$ Case 1: For case 1, the event at state k+1 has to be either SL (u,g) or SR (o,g) or both for $\langle u,o,g,r \rangle \notin [\text{Authz}_{stateful}]\hat{\sigma}_{k+1,k+1}$ to be true. In the stateless specification, if an SL (u,g) or SR (o,g) or both occur at state k+1, both $\lambda_1$ and $\lambda_1$ will be false. Thus $\langle u,o,g,r \rangle \notin [\text{Authz}_{stateful}]\hat{\sigma}_{k+1,k+1}$.

Case 2: Authz is true in both steps k and k+1.
This is the converse of the above case. Here, in function authzSF, the event at state k+1 can be neither SL (u,g) or SR (o,g). Inspecting $\lambda_1$ and $\lambda_2$ in the stateless specification, Authz will continue to hold from state k to k+1 if the transitioning event is not SL (u,g) or SR (o,g).

Case 3: Authz is false in state k but true in state k+1.
In function authzSF, this is possible only if the transitioning event is either LJ, SA or LA (we drop the fixed u, o and g for convenience) with a respective open operation. (An open operation for LJ is an occurrence of LA in the past followed by no remove operation until the state in which LJ occurred. Similarly, an open operation for SA is an occurrence of SJ or LJ in the past followed by no leave operation up to the current state.) Disabling events such as SL, LL, SR and LR cannot occur. Further SJ cannot change Authz from false to true in a single state due the nature of its authorization semantics. In case the event at state k+1 is LJ, function authzSF will return true only if an authorizing LA exists prior to state k+1 with no SR and LR in between. For a corresponding trace in the stateless specification, Authz will be made true by formula $\lambda_2$ in which LA had occurred in the past and subsequently Authz becomes true at the instant an LJ occurs. Similarly, in case the event at state k+1 is SA or LA, an open SJ or LJ event should have occurred in the past from Authz to switch from false to true at state k+1. Again, for a corresponding trace in the stateless specification, Authz will be made true by formula $\lambda_2$.

This case is also possible if both the join and add operations occur in state k+1. In this case, Authz would be true in state k+1 regardless of the join and add semantics. For a corresponding trace in the stateless specification, Authz will be made true by formula $\lambda_1$.

Case 4: Authz is false in both steps k and k+1.
This is the converse of case 3. That is neither LJ, SA nor LA can occur with a respective open operation. The argument for this case is similar to that of case 3.

Lemma 4 (Completeness). For every trace $\sigma$ accepted by $\pi_{stateless}$, there exists an $\alpha$-mapped trace $\hat{\sigma}$ that is accepted by $\pi_{stateless}$ such that:

$$\forall i \in \mathbb{N} \cdot \forall t \in \langle \mathcal{U}, \mathcal{O}, \mathcal{G} \rangle \cdot t \in [\text{Authz}_{\pi_{stateful}}]\hat{\sigma}_i \rightarrow t \in [\text{Authz}_{\pi_{stateless}}]\sigma_i$$

Proof 5. This lemma follows from lemmas 1 and 3. Lemma 1 proves that $\pi_{stateless}$ generates every action trace generated by $\pi_{stateless}$ using $\alpha$-mapping. Lemma 3 proves that every trace generated by $\pi_{stateless}$ is consistent with respect to the authorization relation at every state to a corresponding trace in $\pi_{stateless}$. Thus every $\alpha$-mapped trace of a $\pi_{stateless}$ trace is accepted by $\pi_{stateless}$.

8. Conclusion

According to this disclosure, a highly abstract temporal logic based stateless specification can be grounded in a concrete stateful specification while maintaining equivalency with respect to authorization.

Further according to this disclosure, a methodology for consistent specification and enforcement of authorization policies is presented. The stateless specification is highly conducive to automated formal analysis using techniques such as model checking. However, it cannot be enforced using the way it is specified. The stateful specification focuses on how to enforce the stateless policy using distributed data structures and associated algorithms. This specification can be implemented by programmers. A formal bridge between a highly abstract stateless specification and a relatively concrete stateful specification has also been shown.

The current stateful specification, although highly distributed, maintains unbounded history of user and object actions.

Although the foregoing has been described with reference to one or more embodiments, those having skill in the art will appreciate that many variations are possible. It is intended therefore that this application be limited only by the text of the appended claims.

What is claimed is:

1. An authorization engine for enforcing a group-centric secure authorization policy, the authorization engine comprising:

a processor accessible by a user and configured to execute instructions;

a memory containing an access-limited object and further containing executable instructions configured to instruct the processor to execute a stateful security policy, including the operations:

define a group;

receive a join command wherein the user joins the group as a member;

receive a leave command wherein the user leaves the group;

receive an add command wherein the object is added to the group as to be in the group;

receive a remove command wherein the object is removed from the group; and authorize the user to access the object only when the user is a member of the group and the object is in the group;

wherein the stateful security policy is based on an authorization equivalent to a stateless security policy;

wherein the stateful security policy is configured to enforce well-formedness constraints including:

the object cannot both be added to the group and removed from the group within the same state;

the user cannot both join the group and leave the group within the same state;

two types of operations cannot both occur in the same state for the user or the object;

after joining the group, the user cannot join again unless the user has left the group since joining the group;

after being added to the group, the object cannot be added to the group again unless it has been removed from the group since joining the group;

the user cannot leave the group when the user is not already a member of the group; and the object cannot be removed from the group unless the object is already in the group; and wherein the stateful security policy further sorts operations by time and provides an order of precedence wherein:

when add and join occur in the same state, add follows join;

when join and remove occur in the same state, join follows remove;

when add and leave occur in the same state, add follows leave; and when remove and leave occur in the same state, there is no fixed precedence.

2. The authorization engine of claim 1, wherein a stateless security specification is specified and verified using first order linear temporal logic.

3. The authorization engine of claim 1, wherein the stateful security policy is configured to handle non-well-formed sequences.

4. The authorization engine of claim 1, wherein the join, leave, add, and remove operations include both strict and liberal semantics wherein:

a strict join implies that the user may access the object only when the object is added to the group after the join state;

a liberal join implies that the user may access all objects in the group;

a strict leave implies that the user loses access to the object and any other objects in the group;

a liberal leave implies that the user retains access only to objects that were in the group upon the leave state;

a strict add implies that the user may access the object only when he joined the group before the add state;

a liberal add implies that the user may access the object regardless of when the user joined the group;

a strict remove implies that the user may not access the object or any other object in the group; and a liberal remove implies that the user may access the object when the user was a member of the group upon the remove state.

5. A non-transitory storage medium having stored thereon executable instructions that, when executed, instruct a processor to execute a stateful security policy, including the operations of:

identify a user, a group, and an object;

receive a join command wherein the user joins the group as a member;

receive a leave command wherein the user leaves the group;

receive an add command wherein the object is added to the group as to be in the group;

receive a remove command wherein the object is removed from the group; and authorize the user to access the object only when the user is a member of the group and the object is in the group; and enforce well-formedness constraints wherein:

the object cannot both be added to the group and removed from the group within the same state;

the user cannot both join the group and leave the group within the same state;

two types of operations cannot both occur in the same state for the user or the object;

after joining the group, the user cannot join again unless the user has left the group since joining the group;

after being added to the group, the object cannot be added to the group again unless it has been removed from the group since joining the group;

the user cannot leave the group when the user is not already a member of the group; and the object cannot be removed from the group unless the object is already in the group;

wherein the stateful security policy further sorts operations by time and provides an order of precedence wherein:

when add and join occur in the same state, add follows join;

when join and remove occur in the same state, join follows remove;

when add and leave occur in the same state, add follows leave; and when remove and leave occur in the same state, there is no fixed precedence.

6. The non-transitory medium of claim 5, wherein both strict and liberal semantics are supported.

7. The non-transitory storage medium of claim 6, wherein:

a strict join implies that the user may access the object only when the object is added to the group after the join state;

a liberal join implies that the user may access all objects in the group;

a strict leave implies that the user loses access to the object and any other objects in the group;

a liberal leave implies that the user retains access only to objects that were in the group upon the leave state;

a strict add implies that the user may access the object only when he joined the group before the add state;

a liberal add implies that the user may access the object regardless of when the user joined the group;

a strict remove implies that the user may not access the object or any other object in the group; and a liberal remove implies that the user may access the object when the user was a member of the group upon the remove state.

* * * * *